Oct. 13, 1970  C. W. E. WALKER  3,534,260
METHOD AND APPARATUS FOR MEASURING MOISTURE CONTENT IN
SHEET MATERIALS USING A FREQUENCY MODULATION
FREE MICROWAVE ENERGY BEAM
Filed April 26, 1967  4 Sheets-Sheet 1
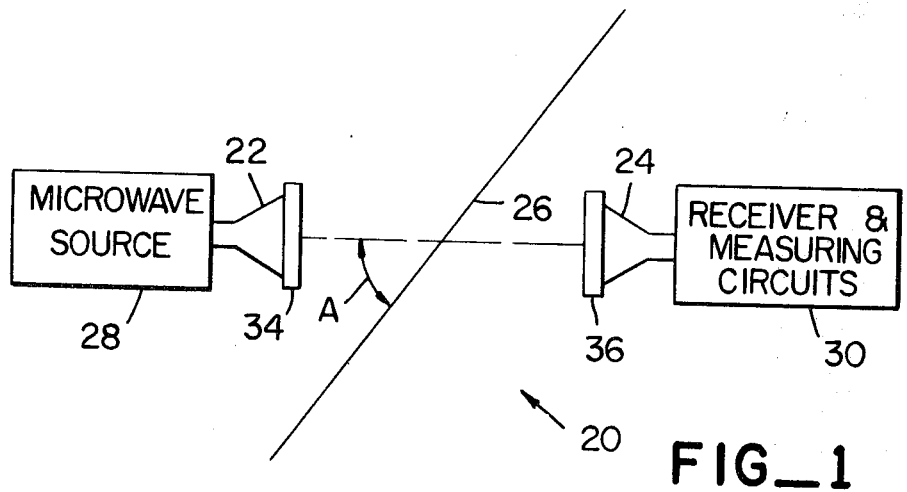
FIG_1
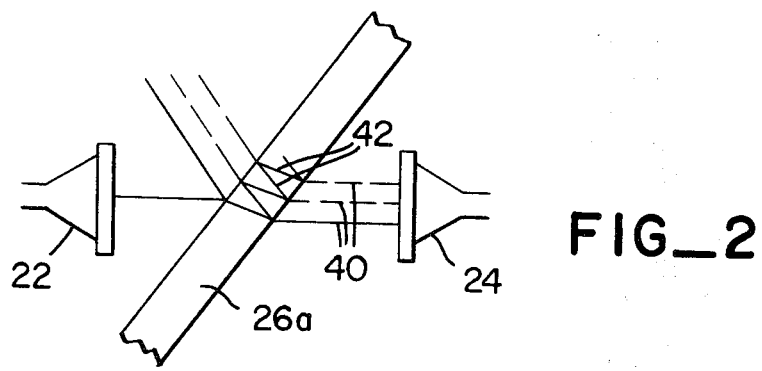
FIG_2
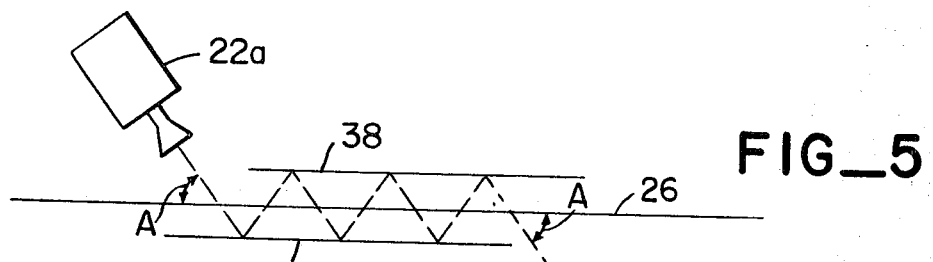
FIG_5
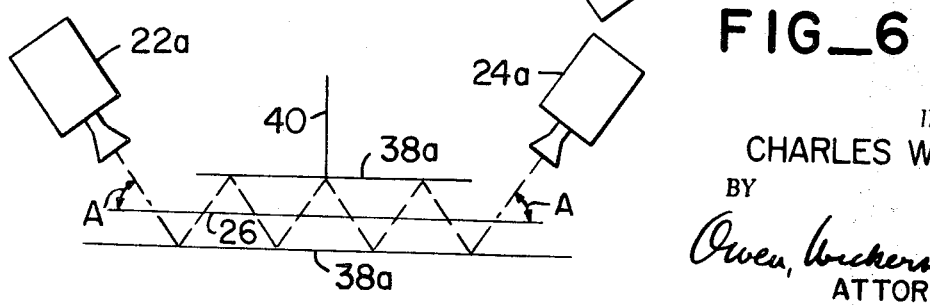
FIG_6
INVENTOR.
CHARLES W. E. WALKER
BY
Owen, Wickersham & Erickson
ATTORNEYS

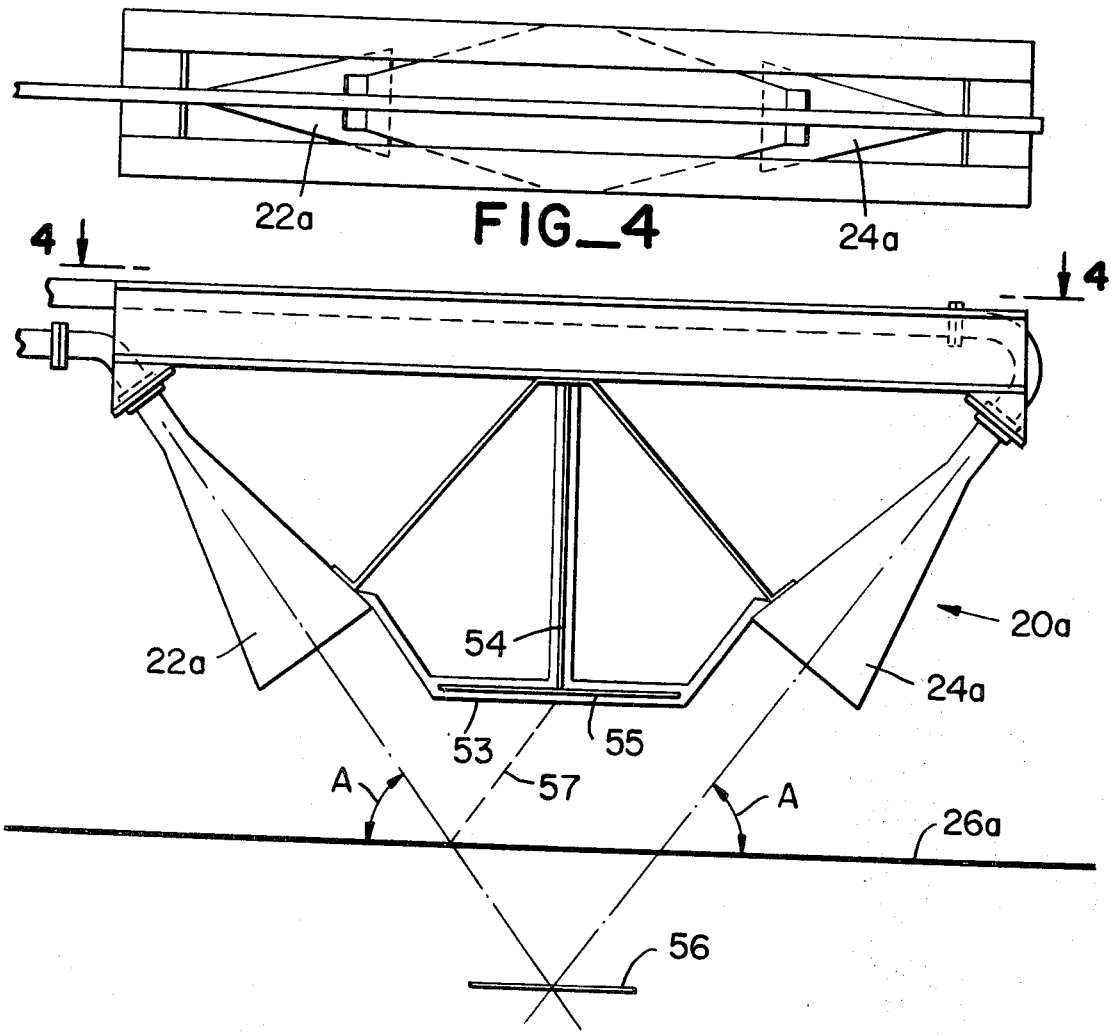

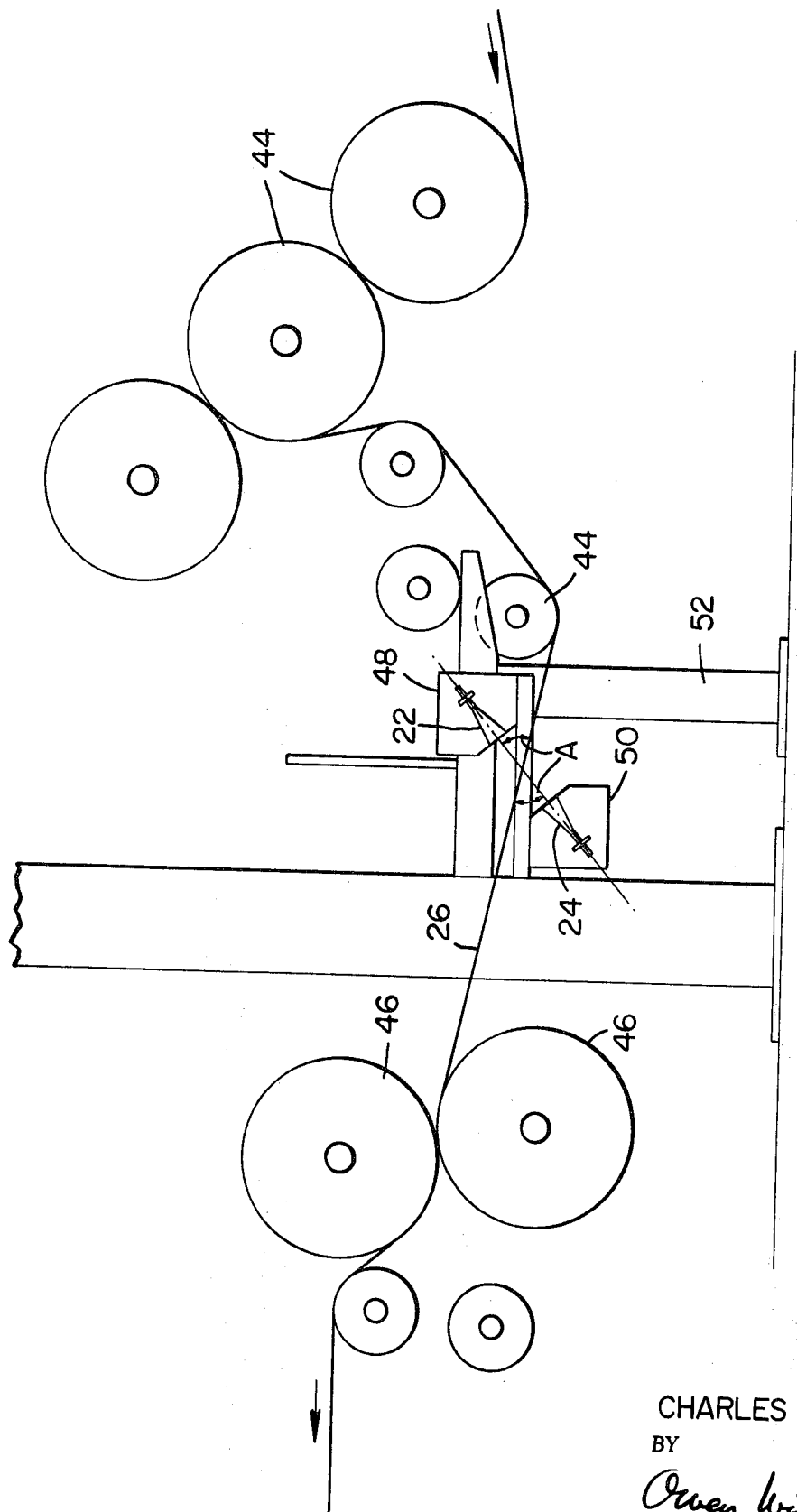

Oct. 13, 1970  C. W. E. WALKER  3,534,260
METHOD AND APPARATUS FOR MEASURING MOISTURE CONTENT IN
SHEET MATERIALS USING A FREQUENCY MODULATION
FREE MICROWAVE ENERGY BEAM
Filed April 26, 1967  4 Sheets-Sheet 4
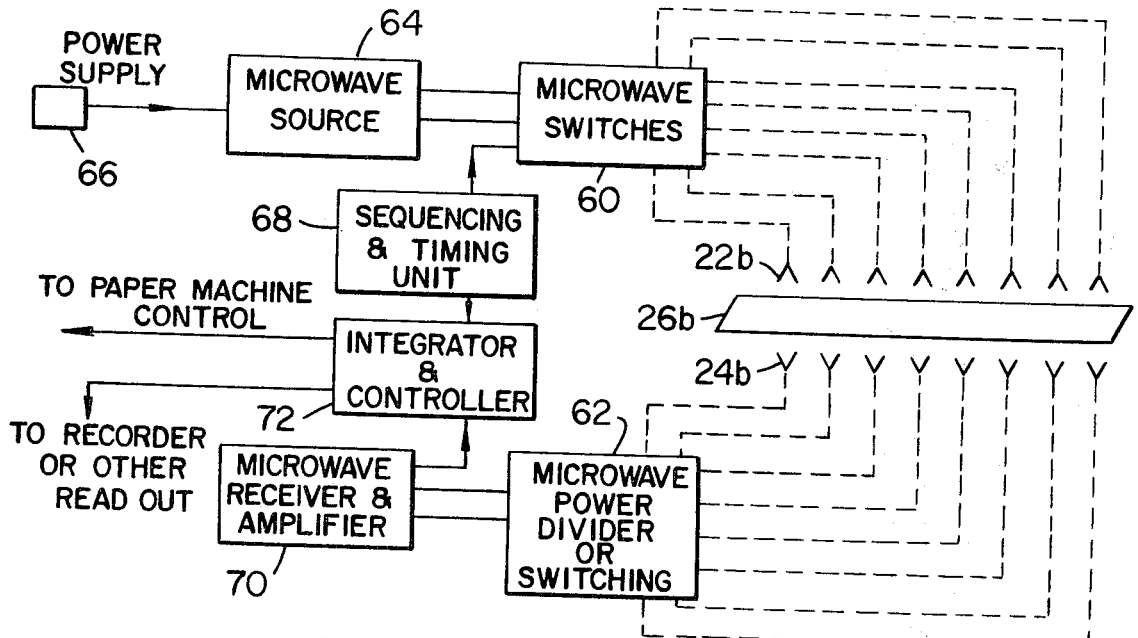
FIG_8
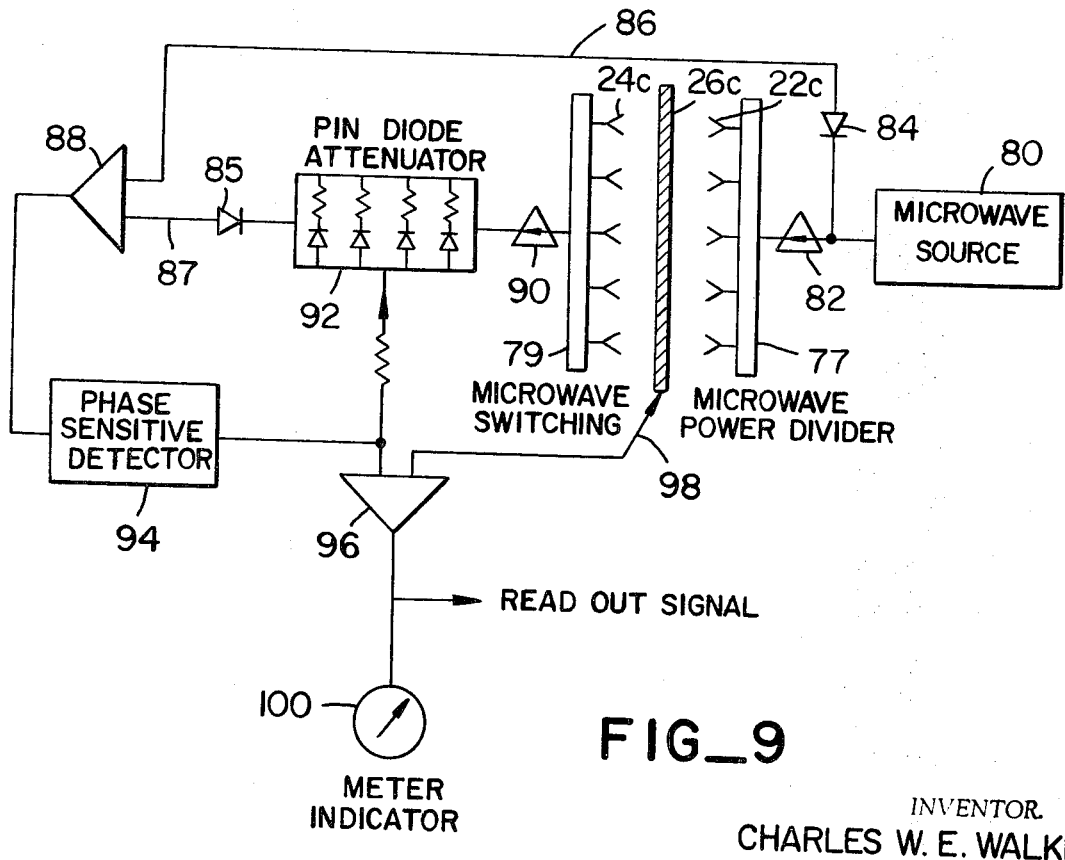
FIG_9
INVENTOR.
CHARLES W. E. WALKER
BY
Owen, Wickersham & Erickson
ATTORNEYS

United States Patent Office 3,534,260
Patented Oct. 13, 1970

1

3,534,260
METHOD AND APPARATUS FOR MEASURING MOISTURE CONTENT IN SHEET MATERIALS USING A FREQUENCY MODULATION FREE MICROWAVE ENERGY BEAM
Charles W. E. Walker, 855 McBride Blvd., Apt. 604, New Westminster, British Columbia, Canada
Filed Apr. 26, 1967, Ser. No. 633,940
Int. Cl. G01r 27/04
U.S. Cl. 324—58.5          18 Claims

ABSTRACT OF THE DISCLOSURE

A method and apparatus for measuring the moisture content of relatively wet sheet material are described employing a microwave source and a microwave receiver which function to transmit and receive energy through the sheet material. The sheet material is oriented at a critical angle relative to the beam of microwave energy to prevent portions of such energy reflected externally by the sheet from reaching such source or receiver and causing distortion. The receiver is connected to components which measure the attenuation of the energy proportional to the moisture content. Various embodiments are disclosed which include different positions of the transmitter and receiver horns utilizing the critical angular relationship including arrays of multiple horns to obtain profile measurements across sheets.

---

This invention relates to an improved method and apparatus for determining the moisture content of various solid sheet materials by means of microwave energy.

In manufacturing processes involving sheet materials, moisture content is a vital factor that must be measured and controlled. My invention is particularly concerned with the problem of measurement of water in relatively wet sheet materials containing sufficient moisture to reflect enough microwave energy to enable standing wave patterns to be produced between the sheet and the microwave transmitter or the sheet and the microwave receiver which causes distortion of the received signal. This problem exists in paper and paper-making felts in which the moisture content exceeds 12% and is solved to a large extent by preventing the portions of the microwave energy reflected externally by the sheet from reaching the transmitter or receiver.

Heretofore, this measurement was possible only by withdrawing a sample of the sheet being produced, weighing it, drying it in an oven and reweighing it. Usually this method required a production shutdown to obtain the sample and was slow and costly. The result was that the measurement was seldom made even though substantial improvement in the product could have been obtained if the information was available. Attempts were made to provide a measurement by using two radioactive gauges measuring the total weight of the sheet plus water, one gauge being located at the dry end of the machine where the sheet is substantially all paper fiber and the other gauge being located at the place where it was desired to know the water content. The difference of the two readings then provided a measure of the water. However, this method has not been widely accepted due to high cost and insufficient accuracy. Moreover, the long time delay in the passage of the paper from the press section to the dry end of the machine also caused some difficulties.

Another attempt to solve the problem in paper making was to compute the water in the sheet from a water flow balance taken over the whole wet end of the paper-making machine. This procedure, however, proved to be entirely too inaccurate. Thus, prior to the present invention, no satisfactory methods were known for measuring the water content of the paper sheet above about 12% moisture content, and no method was known for measuring the water content of the wool felts used in the press section, or of the cotton, asbestos, or synthetic felts used in the drier section of paper-making machines during the machine's operation. Likewise, prior to the present invention, no accurate method was known and no apparatus was available for measuring the moisture content of "green veneers" in plywood manufacturing or, in fact, for measuring high moisture content, i.e., above 12%, in any sheet materials.

It is therefore a general object of the present invention to provide an apparatus and method for measuring the moisture content of sheet materials wherever their moisture content exceeds 12%.

Another object of the present invention is to provide an improved method and apparatus for measuring the moisture content of materials that utilizes the absorption phenomea of microwaves in water, particularly microwaves having a resonant frequency for the water molecule. Although this resonant frequency occurs at approximately 22 gc/s., it is a broad resonance. It has been found that the same properties of selectivity for water with negligible effects due to dissolved electrolytes and other extraneous causes is also evident over a wide frequency band extending down to frequencies generally referred to as X-band in microwave technology and extending upwards to the limit of the microwave spectrum. The sensitivity to water at X-band is appreciably less than at the resonant frequency at 22 gc./s. in what is generally known as K-band but is sufficient to provide good measurement accuracy and has the advantage that the cost of X-band components is generally less than the cost of the equivalent K-band components.

In my U.S. Pat. No. 3,079,551 issued Feb. 26, 1963, one arrangement is shown in which a frequency modulated beam of microwaves is transmitted through a sheet from a transmitting horn to a receiving horn. Here, I showed the plane of the sheet generally inclined to the direction of transmission of the microwaves but not at any particular angle because, in this patent and at that time, I was concerned entirely with the measurement of the moisture content at the dry end of the paper-making machine in the region of 0 to 12% moisture. In this relatively dry region the reflections from the surface of the sheet were insufficient to cause standing wave patterns as described below and so the problem did not arise. However, in attempting to solve the problem of measuring the moisture content of relatively wet sheet materials I discovered that if a relatively wet sheet is set so that its plane is normal to the direction of transmission, or nearly so, there is strong reflection of energy from the front side of the sheet itself back to the transmitting horn causing multiple external reflections and interference effects to occur in this region. Also, I found that similar multiple reflections and interference effects occurred in the space between the back side of the sheet and the receiving horn due to similar reflections back and forth therebetween. The changes in received signal resulting from moving either the receiver, the sheet or the transmitter were found in fact to be large enough due to such reflections and interference effects to seriously affect the accuracy of measurement. At the same time I found that sufficient energy is reflected from receiving and transmitting horns which are commercially available to have an adverse effect on measurement accuracy by producing standing waves.

Thus, another object of the present invention is to overcome the aforesaid interference and reflection problems inherent with relatively wet sheet material and provide a method and apparatus that will produce accurate and reliable results. I discovered that both sets of multiple reflections can be completely eliminated by locating the sheet at a sufficiently large angle relative to microwave transmitting and receiving horns so that none of the energy externally reflected by the sheet reaches either of the horns. The particular spacing of the horns and range of angles for achieving the results according to my invention will be discussed later in detail with respect to the apparatus illustrated in the drawings.

Another object of the present invention is to provide a microwave system for measuring the moisture content of relatively wet sheet material wherein a microwave source and a receiver are arranged in a predetermined angular relationship with respect to and on opposite sides of the sheet material being tested.

Another object of the present invention is to provide a microwave system for measuring the moisture content of relatively wet sheet material wherein a microwave source and a receiver are arranged in a predetermined angular relationship with respect to and on the same side of the sheet material being tested.

Still another object of my invention is to provide a microwave method and apparatus for measuring the moisture content in sheet materials which reduces the multiple reflections and the concomitant interference effects between horn and horn, and between horn and wet sheet, by utilizing an absorbing material at the mouth of or in the space in front of the horn or antenna.

A further object of the present invention is to provide a system and a method for determining the variation in moisture content over relatively wide areas of sheet materials, and moreover to solve the problem of determining the relative moisture content of adjoining increments of width of sheet material along a line transverse to the direction of movement. One application of this feature is in the manufacture and quality control of paper since it enables wet streaks of particularly moist material to be readily detected as the material is conveyed. It also has an important application in plywood manufacturing. This determination of moisture content over wide areas of sheet material is accomplished in a unique manner by use of a plurality of microwave sources which are spaced apart along a line transverse to the direction of movement of the sheet material being tested, each of the sources having an associated microwave receiver positioned to receive the microwave energy after it has passed through the sheet material.

An objective related to this latter phase of my invention is to provide a switching system that is fast and accurate and thereby provides a running profile of moisture content values for increments of width across the sheet material being tested. To accomplish this object an electronic switching system is utilized to actuate the microwave horns rapidly in sequence to provide a measure of moisture content at intervals across the sheet.

Other objects, advantages and features of the present invention will become apparent from the following detailed description presented in conjunction with the accompanying drawings, in which:

FIG. 1. is a schematic view showing a moisture measuring system for sheet materials embodying the principles of the present invention;

FIG. 2 is a schematic view illustrating the phenomena of internal reflections of microwaves in sheet materials;

FIG. 3 is a view in elevation showing an installation of a modified form of moisture measuring apparatus according to the present invention;

FIG. 4 is a view in section taken along line 4—4 of FIG 3;

FIG. 5 is a schematic view of a modified form of moisture measuring system according to my invention;

FIG. 6 is a schematic view of another modified form of my invention;

FIG. 7 is a view in elevation showing another installation of a moisture-measuring apparatus embodying the features of my invention;

FIG. 8 is a schematic block diagram of a modified form of moisture-measuring system according to my invention particularly adapted for covering the full width of sheet material;

FIG. 9 is a schematic block diagram of a system according to my invention and similar to FIG. 8.

Referring to the drawing, FIG. 1 illustrates schematically a moisture-measuring system 20 embodying the principles of the present invention. Broadly speaking, it comprises a microwave generating horn or antenna 22 which radiates microwave energy and a microwave receiving horn 24. Between these two microwave horns is a wet sheet of material 26 through which the microwave energy is projected for measuring the moisture content of the material, such sheet material containing sufficient moisture to reflect enough microwave energy to cause standing wave patterns to be produced between the sheet and the horns if they are not positioned in accordance with the present invention. The microwave signal is free of frequency modulation and may be generated by a suitable transmitter system 28 which typically includes a klystron fed by a power supply controlled by a pulse modulation source.

The microwave receiver system 30 may typically include a calibrated variable attentuator, a detector, an amplifier and an output meter or indicating device which provides a measure of attenutation by procedures well known to those skilled in the art.

In the arrangement shown in FIG. 1, the microwave receiving horn antenna 24 is aligned with the direction of microwave energy from the transmitter horn 22, the energy entering and leaving the wet sheet material 26 at a predetermined angle. To overcome the problem of external reflections from the sheet material I found that a great improvement in accuracy was achieved by positioning the microwave transmitting horn so that the transmission of the microwaves from it is along a line that intersects the sheet material at an angle A of between 40° and 65°, and preferably between 50° and 55°, the optimum being 53°.

When using ordinary standard X-band pickup horns no reflection effects between the transmitting horn and sheet are observable if the sheet is turned from a position normal to the direction of energy from the horn to a position of 35° to the normal, i.e., if the angle A is less than 55°. If the incidence angle A of transmitted energy is decreased below 50°, the received signal becomes increasingly sensitive to this angle so that any angular fluctuation or variation due to flutter or movement of the sheet could cause errors in the moisture reading. Down to about 40° the sensitivity to angle seems to be small enough to give acceptable results under most circumstances, but an angle A of greater than 50° is preferred. It is also desirable in this arrangement that the distance between horn and sheet should not be less than about four inches.

A further step which was found to be effective in substantially reducing the multiple reflections and the concomitant interference effects and which is also effective on reflections between horn and horn, and between horn and wet sheet, is the use of a pair of energy absorbing barriers 34 and 36 placed across the mouth of both the horns or antennas 22 and 24, or more generally in the space in front of the horn as shown in FIG. 1. The barrier material absorbs some of the microwave energy passing through it but reflects little of the microwave energy reaching it from the side away from the horn. Preferably, it should attenuate a microwave signal passing through it by from 3 to 6 decibels and that the energy reflected from its surface should be at least 10 decibels and preferably 15 decibels or more below the level of the incident energy. A suitable material meeting these requirements is a foamed plastic such as polyurethane containing a lossy conductive ingredient such as graphite. Commercially available material of this type in sheets ¼" thick, for example, attenuates an X-band microwave signal passing through it by about 5 decibels, while the reflected energy from its surface is about 15 decibels below the level of the incident energy.

Thus, in accordance with my invention a combination of both features, as illustrated in FIG. 1, (1) the sheet angled at the angle A of about 53° to the direction of transmission and (2) the absorbing material 34 and 36 placed across the mouth of both transmitting and receiving horns 22 and 24, provides a highly accurate means for measuring the water content of sheet material having over 12% of moisture.

In addition to the attenuation produced by a wet sheet, I further found that internal reflections within the sheet can affect the accuracy of the moisture measurement. For example, in a sheet which is at least 50% water, approximately 80% of the energy which has passed through the sheet and reached the far surface is internally reflected at that far surface so as to pass back through the sheet to the front surface where again 80% of the energy reaching the front surface is internally reflected, and so on. This is illustrated schematically in FIG. 2. Clearly, the signal indicated by the numeral 40 emerging from the far side of the sheet 26a is a composite of parts of the energy which have traversed the sheet 1, 3, 5, 7, etc., times as indicated by the internal reflections 42. At each passage of the energy within the sheet there is attenuation due to absorption of energy by the water as well as reduction to 80% at each internal reflection. In a heavy wet sheet (for example, 90-pound paperboard with 50% water) the thickness of the sheet is an appreciable fraction of a wavelength in the sheet at X-band, so that there is an appreciable phase difference between the energy components which have traversed the sheet 1, 3, 5, 7, etc., times. At sufficient thickness this produces interference effects and limits to the accuracy with which some heavy sheets having high moisture content can be measured at X-band. For example, a 90-pound paperboard, i.e., 90 pounds/1,000 ft.$^2$, can be measured accurately up to 64% water (wet basis) whereas a 64-pound sheet can be measured up to at least 72% water (wet basis). At K-band the absorption of the energy during each passage through the sheet is approximately three times greater and interference effects are considerably reduced. The result is that K-band, and in particular 22 gc./s., can be effectively used for measuring the water content of sheets having higher weights and water contents than is possible at X-band. This is directly contrary to simple expectation and to experience in using microwaves to measure moisture content of most other substances. It arises because of the predominant role of reflections as I have found and described. In the measurement of most substances (for example, fertilizers, iron ore, grains) attenuation of the microwaves is principally due to absorption of the energy by the water during a single passage through the material so that with X-band microwaves it is possible to measure approximately three times as much material at the same moisture percentage, or more generally three times as much water as with K-band. With sheet materials on the other hand, as illustrated by the case of 90-pound board with 50% water, 90-pound paper fiber and 90-pound water per 1,000 square feet, there is approximately 3-decibel reduction in the energy transmitted due to reflection at the front face, approximately 7-decibel reduction due to internal reflection at the back face, and at X-band only approximately 1.6-decibel attenuation due to absorption by the water during a single passage through the sheet. Since the thickness of this wet sheet is approximately ⅛ wavelength at X-band, it is evident that interference effects resulting from multiple internal reflections will cause measurement difficulties as the moisture content is increased long before attenuation of the signal by absorption in the water becomes so great that the received signal is too weak for accurate measurement. At K-band the attenuation by water absorption in the above illustration would be approximately 4.8 decibels during a single passage through the sheet. This is already large enough that the effect of multiple internal reflections is small and as the water content is increased their effect becomes negligible, but the total attenuation of the signal in passage through the sheet remains small enough that effective measurement is possible up to at least 5 times the quantity of water present in the above illustration.

The microwave signal transmitted along standard rectangular waveguide and transmitted or received by standard horns is plane polarized with the electric vector parallel to the narrow wall of the guide. To obtain the best accuracy in the measurement of moisture by the methods of this application and to minimize the effects of disturbances in the system it has been found preferable to have the electric vector parallel to the plane of the sheet. Among the aforesaid disturbances in the system that may occur are those due to sheet flutter which cause a slight variation of the angle A.

An alternate arrangement for a system 20a, according to my invention, is shown in FIGS. 3 and 4 wherein a pair of transmitting and receiving horns 22a and 24a are located on the same side of the sheet material 26a whose moisture content is being measured. Here, the horns are held in a frame 54 so that the horn axes lie in the same vertical plane, as shown in FIG. 4. Both horns are equally spaced from the sheet material and are positioned so that each makes an angle A with the sheet. Again, the angle A is preferably 53°. Spaced from the surface of the other side of the sheet material is a reflecting plate 56 whose surface passes through the intersection of the horn axes and is so located and oriented as to reflect the maximum amount of microwave energy from the transmitting horn into the receiving horn. Thus, microwave energy directed from the transmitting horn passes through the sheet material, strikes the reflecting plate and passes back through the sheet material before entering the receiving horn. The member 54 placed between the horns is so shaped as to eliminate entirely any energy reaching the receiving horn directly from the transmitting horn without passing through the sheet. For this purpose it is made of metal or other conductive material and is covered with microwave absorbing material 53, particularly on its lower face 55 to absorb energy reflected from the sheet as indicated by dashed line 57.

In FIGS. 5 and 6, a slightly modified arrangement of microwave transmitting and receiving horns is shown schematically. Here, the microwave energy from the transmitter horn 22a is reflected between a pair of plates 38 before being received by the receiving horn 24a. The plates are of metal such as aluminum and are fixed preferably parallel to each other and spaced at roughly equal distances on the opposite sides of the sheet. In the arrangement of FIG. 5, the transmitting and receiving horns are located on opposite sides of the sheet material and on the FIG. 6 arrangement they are spaced apart on the same side. In the latter arrangement a metal shield 40 is provided normal to the upper reflecting plate and equally spaced between the two horns. In both of the arrangements using the parallel reflectors the horns in accordance with the principles of my invention are arranged so that the microwave energy is projected on and received from the sheet material at an angle of incidence of substantially 53°, thereby eliminating any problems of reflections. Both of these latter embodiments have proved to be particularly useful with lightweight paper and relatively dry board for which the reduction in the microwave signal in a single passage through the sheet is too small to provide good measurement accuracy.

Another typical installation embodying the arrangement of the transmitting and receiving horns 22 and 24 for the system 20, is shown in greater detail in FIG. 7. Here a continuous strip of wet sheet material passes around a series of preliminary rollers 44 and then extends between the transmitting and receiving horns, before passing around additional aligning rollers 46. As shown, both horns or antennas are fixed in suitable supporting box frames 48 and 50 respectively, and are held rigidly in position on a main frame 52 so that their centerline axes are aligned, and both make an angle A with the sheet. As discussed previously, the angle A is preferably 53°. Each antenna is preferably spaced from opposite sides of the sheet material by an equal amount. The various electronic components for the transmitting and receiving systems are not shown but can be connected to them by suitable cable and located conveniently near the sheet-conveying apparatus.

Although the arrangements of FIGS. 3 to 7 show a single pair of transmitting and receiving horns, a plurality of spaced apart horn pairs may be utilized for measuring the moisture content of wide sheets of paper or other such materials. For example, in FIG. 7 the box frames 48 and 50 may support a plurality of horn pairs thus making the apparatus particularly useful where the full width measurement of moisture content in sheet materials is important. In such an embodiment an array of similar pairs of transmitting and receiving horns are arranged along a line that is transverse to the direction of travel of the sheet material being processed. FIG. 8 shows a schematic plan view of this embodiment with pairs of transmitting and receiving horns 22b and 24b on opposite sides of sheet material 26b that passes between them. Each of the transmitting horns is connected to a microwave switching unit 60 and similarly, each of the receiving horns is connected to a microwave power combining or switching component 62. The microwave switching function can be accomplished by diodes or ferrites for switching purposes in the well-known manner. Power combining can be accomplished with wave guide components commercially available. A microwave signal source 64 fed by a power supply 66 furnishes the microwave signal energy to the switching unit 60, which also is connected to a suitable sequencing and timing unit 68. Thus the transmitting horns 22b are successively connected to source 64 so that each horn emits microwaves of the same frequency. A microwave receiver and amplifier unit 70 is connected to and receives signal energy from the power combining or switching unit 62 for the receiving horns. Both the sequencing and timing unit 68 and the receiver and amplifier unit 70 furnish inputs to an integrator and controller 72 which provides continuous output signals proportional to the moisture content of the sheet material between the aligned horn pairs. Thus, the output signals from this latter component can be supplied to the machine controlling the sheet material or to a suitable recording device.

The block diagram of FIG. 9 shows the system utilizing an array of electronically switched transmitting and receiving horn pairs in somewhat greater detail. Here, a plurality of receiving and transmitting horns 24c and 22c are again located along a line transverse to the direction of travel of the sheet material, and are spaced apart so as to cover the entire sheet width. The transmitting horns 22c are fed microwaves of the same frequency from a power divider 77, and the receiving horns 24c are connected to a high speed diode or ferrite switching unit 79 as previously described in connection with FIG. 8.

A suitable microwave source 80 supplies microwave energy pulse modulated at 3,200 c./s. or other suitable frequency or cw through an isolator 82 to each transmitting horn. A reference signal from the microwave source is simultaneously supplied through a reference detector 84 in a lead 86 to a differential amplifier 88 in the receiving circuit. Each receiving horn antenna 24c receives microwave energy passing through the sheet material from its aligned transmitter horn antenna 22c and sends it first through an isolator 90 and thence to a PIN diode variable attenuator 92. The output from the PIN diode attenuator is fed through a detector 85 in a lead 87 to the differential amplifier 88, and the latter combines this input with the transmitter reference signal to produce an amplified output of the difference between the two inputs. This amplified output is fed as the control signal to the PIN diode attenuator 92 either directly or via a suitable phase-sensitive detector 94, as shown in FIG. 9. The PIN diode attenuator 92 thereby operates to maintain the signals in lead 87 essentially equal to the reference signal in lead 86. At the same time, the control signal to the PIN diode attenuator 92 is directly related to the attenuation which the latter is required to provide and thus to the moisture content of the sheet being measured. Hence, the control signal, which is the output of the differential amplifier 88 or of the phase-sensitive detector 94, as the case may be, is fed to an analog converter 96. Another input lead to the analog converter may be connected to a temperature sensor 98 on the sheet material being tested. Again, the output from the analog converter may be connected to a meter indicator 100 or other suitable readout device giving a readout signal proportional to moisture content. The advantageous result provided by the PIN diode attenuator 92 is due to its high speed of response which enables equality of the signals in leads 86 and 87 to be achieved in a time of the order of microseconds or less so that the horn pairs 22c and 24c may be scanned rapidly (in the order of milliseconds or less) to obtain the profile of moisture content across the sheet material.

With a series of horns, electronically switched, the switching can readily be programmed in any manner or sequence desired; in particular, a scan can be made rapidly from one side of the paper machine to the other with instantaneous return to the starting point. Since it is convenient to pulse modulate the microwave source, it is only necessary to keep the signal at each horn pair for the period of a few pulses. Thus, for example, using a pulse recurrence frequency of 3,200 per second and 16 horn pairs, a complete scan can be completed in about 20 milliseconds. If desired, this can be integrated with a simple capacitor circuit to give the mean moisture for the whole sheet. This may be repeated in such a system with sufficient rapidity so that it can be fed to a strip chart recorder, or other suitable readout device to give an essentially continuous reading of total sheet moisture. The aforesaid system can also be set up or "programmed" to provide essentially continuous control signals to each section of a sectionalized drier device; for such an arrangement the number of horn pairs would, of course, be equal to the number of drier sections across the machine width. Alternatively, the system can be set up to indicate the location of wet streaks in the sheet or in plywood manufacture to indicate high moisture areas or patches in the green veneers which will require more drying time to reach a satisfactory dryness for good glue bonding in plywood.

With respect to the embodiments of FIGS. 8 and 9 just described, my unique combination of an array of multiple horn pairs together with high speed switching and the PIN diode attenuator makes it possible to obtain extremely rapid, accurate moisture content measurements for a multiplicity of area increments which comprise larger

I claim:

1. An apparatus for rapidly measuring the moisture content of a plurality of small area increments of relatively wet sheet material moving at a constant linear rate, said apparatus comprising:
   a microwave generating means including a plurality of transmitting horns, each delivering a beam of microwave energy of the same frequency;
   a microwave receiving means including a plurality of receiving horns, said transmitting and receiving horns being arranged in pairs located transverse to the lineal movement of the sheet material with each receiving horn being positioned to receive a beam of microwave energy from a transmitting horn of said generating means after it passes through said sheet material;
   timing means for sequentially actuating each pair of transmitting and receiving horns;
   and signal comparing means in said microwave receiving means for providing a readout dependent on the difference between a reference signal and the signal produced by a receiver horn from microwave energy that has passed through the sheet material.

2. The apparatus as described in claim 1 wherein said signal comparing means includes:
   a PIN diode attenuator for receiving signals from said receiving horns;
   a differential amplifier for receiving the output from said attenuator;
   and means providing a reference signal from said microwave source to said amplifier.

3. The apparatus as described in claim 2 wherein said output and receiving horns are secured in rigid frames which support the horns so that each beam of microwave energy falls on and passes from the sheet material at an angle of incidence of from 40° to 65°.

4. The apparatus as described in claim 3 wherein said frames are on the opposite sides of said sheet material.

5. The apparatus as described in claim 3 wherein said frames are on the same side of said sheet material; a shielding plate spaced midway between said transmitting and receiving horns and normal to said sheet material; and a reflector plate on the opposite side of the sheet material from said horns and oriented to reflect microwave energy from said transmitting horns to said receiving horns, said latter plate passing through the intersection of the axes of the microwave beam axes produced and received by said horns.

6. A method for measuring the moisture content of a relatively wet sheet material containing more than 12% of water, comprising the steps of:
   generating a beam of microwave energy free of frequency modulation whereby standing wave patterns tend to be produced by reflections of said beam from said sheet; directing the beam of microwave energy at the wet sheet so that the angle of incidence of the beam is in the range of 50° to 56° to prevent the formation of said standing wave patterns;
   receiving the beam of microwave energy which passes through the sheet of material and leaves it also at an angle of from 50° to 56° without receiving any microwave energy reflected from said sheet to prevent the formation of said standing wave pattern; and
   measuring the attenuation of the microwave energy directed through the sheet material.

7. The method as set forth in claim 6 wherein said microwave energy is passed through the sheet material from a transmitting horn and reflected back through the sheet material to a receiver horn.

8. A method of measuring a plurality of small area increments of a sheet of wet material that is moving linearly at a constant rate, comprising the steps of:
   providing an array of transmitting horns each capable of directing a pulse of microwave energy and a receiving horn for each transmitting horn and positioned to receive the pulse of microwave energy after it has passed through the sheet of material;
   sequentially energizing said transmitting horns in a predetermined timed relation to send pulses of microwave energy of the same frequency through said sheet material;
   sequentially switching said receiving horns in the same timed relation as said transmitting horns; and
   sequentially comparing the microwave energy received with the energy transmitted with each pair of transmitting and receiving horns.

9. An apparatus for measuring the moisture content of relatively wet sheet material containing sufficient moisture to reflect enough of the microwave energy applied thereto to enable standing wave patterns to be produced which tend to cause inaccurate measurements, comprising:
   a microwave generating means including a transmitting horn means for delivering a beam of microwave energy therefrom free of frequency modulation, whereby said standing wave patterns tend to be produced;
   a microwave receiving means including a receiving horn means positioned for receiving the beam of microwave energy from said generating means after it passes through said sheet material; and
   support means for supporting said sheet material at an acute angle to the beam of microwave energy so that when the beam strikes the sheet material a first portion of said beam is externally reflected from said sheet material in a direction other than toward said transmitting horn means or said receiving horn means to prevent said standing wave patterns, while a second portion of said beam is transmitted through the sheet material and partially absorbed by the moisture therein before being transmitted to the receiving horn means to produce a received signal corresponding to the moisture content.

10. An apparatus in accordance with claim 9 which also includes indicator means for converting the received signal into a visual indication of the moisture content, and wherein the sheet material has over about 12% moisture present and the beam of microwave energy is directed at and is transmitted from the sheet material at an acute angle in the range of between 40° to 65°.

11. The apparatus as described in claim 10 wherein said angle is approximately 53° with respect to the sheet material.

12. The apparatus as described in claim 9 wherein said transmitting horn means and said receiving horn means are separate horns located on opposite sides of said sheet material and in alignment with each other.

13. The apparatus as described in claim 9 wherein said transmitting horn means and said receiving horn means are separate horns located on the same side of said sheet material, and which includes reflector means on the opposite side of said sheet material from said horns located and oriented to reflect the microwave energy along a path through the sheet material and into said receiving horn.

14. The apparatus as described in claim 9 including a barrier member between at least one horn means and said sheet material, each said barrier member being comprised of a microwave energy absorbing material which reflects less of the microwave energy striking said barrier member than is transmitted through said barrier member.

15. An apparatus in accordance with claim 9 which also includes means for causing relative movement between said sheet material and said horn means to enable measurement of the moisture of different portions of said sheet material.

16. The apparatus as described in claim 14 in which the barrier member is made of an electrically conductive plastic foam material.

17. A microwave apparatus in accordance with claim 16 in which the plastic foam is polyurethane containing graphite as the conductive material.

18. The apparatus as described in claim 9 including a pair of reflector plates spaced from and approximately parallel to each other and locaetd on opposite sides of said sheet material, said horns being spaced from the ends of said plates so that the beam of microwave energy from the transmitting horn passes through said sheet material a plurality of times before being received by said receiving horn.

References Cited

UNITED STATES PATENTS

| 3,079,551 | 2/1963 | Walker. |
| 3,155,898 | 11/1964 | Chope. |
| 3,240,995 | 3/1966 | Morris. |

FOREIGN PATENTS 1,052,250  12/1966  Great Britain.

E. E. KUBASIEWICZ, Primary Examiner